No. 721,199. PATENTED FEB. 24, 1903.
C. E. KELLY.
SPEED INDICATOR.
APPLICATION FILED OCT. 18, 1901.
NO MODEL.
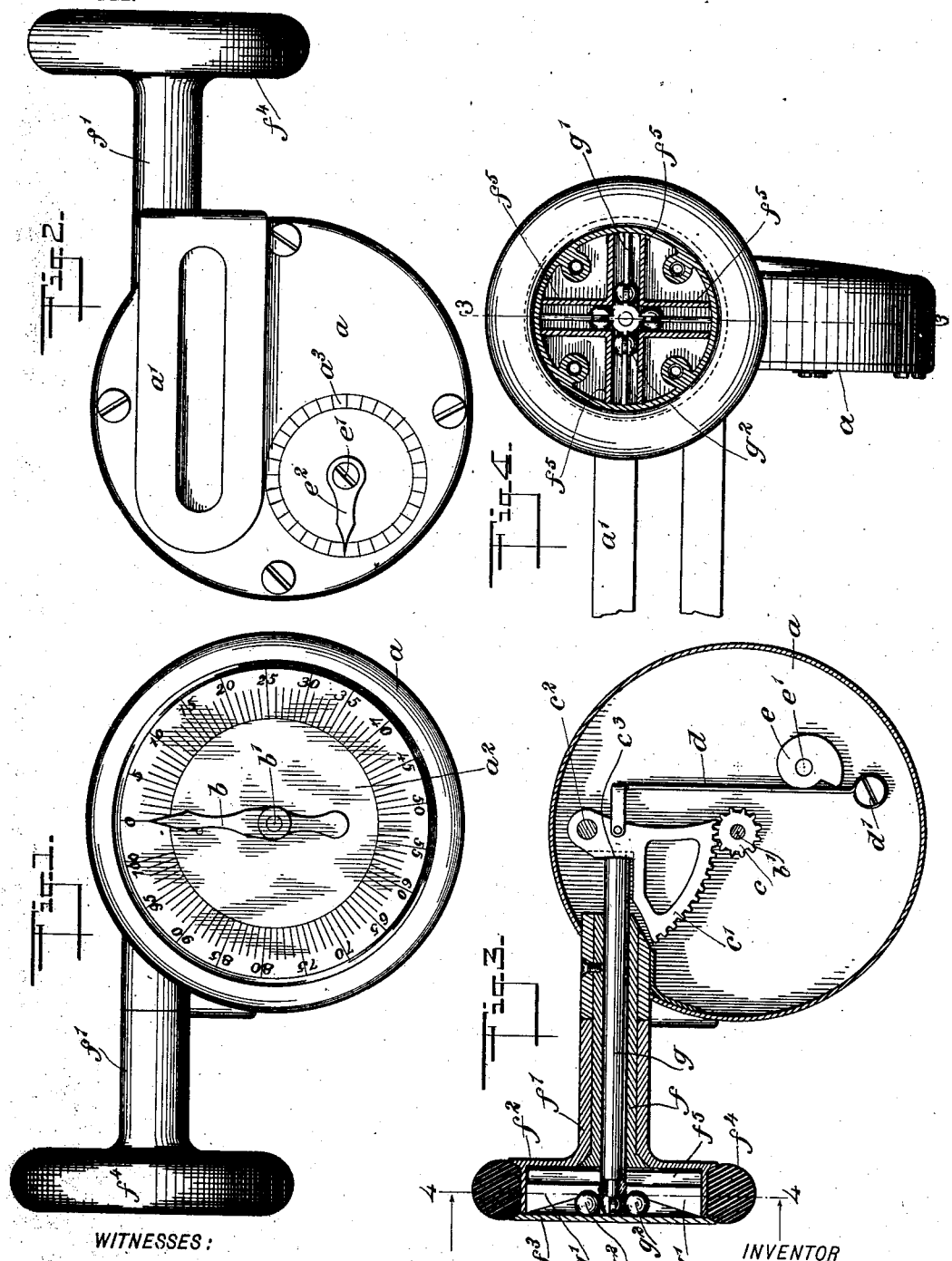
WITNESSES:
INVENTOR
Clarence E. Kelly
BY
ATTORNEYS

UNITED STATES PATENT OFFICE.

CLARENCE EDWAN KELLY, OF ANDERSON, INDIANA, ASSIGNOR OF ONE-HALF TO WILLIAM H. FORSE, JR., OF ANDERSON, INDIANA.

SPEED-INDICATOR.

SPECIFICATION forming part of Letters Patent No. 721,199, dated February 24, 1903.

Application filed October 18, 1901. Serial No. 79,169. (No model.)

*To all whom it may concern:*

Be it known that I, CLARENCE EDWAN KELLY, a citizen of the United States, and a resident of Anderson, in the county of Madison and State of Indiana, have invented a new and Improved Speed-Indicator, of which the following is a full, clear, and exact description.

This invention relates to a device for indicating the speed or other movement of machinery of any sort—for example, for indicating the speed of a vehicle in traveling over the ground.

This specification is a specific description of two forms of the invention, while the claims are definitions of the actual scope thereof.

Reference is to be had to the accompanying drawings, forming a part of this specification, in which similar characters of reference indicate corresponding parts in all the views.

Figure 1 is a face view of a speed-indicator embodying my invention. Fig. 2 is a rear elevation thereof. Fig. 3 is a section on the line 3 3 of Fig. 4, and Fig. 4 is a section on the line 4 4 of Fig. 3.

The apparatus has a suitable case $a$, provided with a bracket $a'$, by which the case may be fastened to a suitable support. In case of use on a vehicle the support will be provided by some convenient part of the bicycle-frame. This bracket may be of any form desired, so as to accommodate the position in which the indicator is to be placed. The indicator is provided (see Fig. 1) with a dial $a^2$, which may be glass-covered, if desired, and over which plays a needle $b$, carried on a rotary arbor $b'$, mounted in the case. Fastened to the arbor $b'$, back of the dial $a^2$, is a pinion $c$, which is meshed with a toothed sector $c'$, arranged within the case and swinging around a center $c^2$, which may be a stub-shaft or other means for carrying the sector.

$d$ indicates a spring which is arranged within the case and connected at one end to the sector, the other end of the spring being fastened to a screw or stud $d'$ held in the case.

$e$ indicates a cam which is mounted on an arbor $e'$ in the case, this arbor extending out through the back of the case and carrying a needle $e^2$, which turns over a dial $a^3$, formed on the back of the case. By throwing the needle $e^2$ from one position to another the cam $e$ may be caused to press against the spring $d$, thus to increase or decrease the tension thereof, and thus regulate the resistance to the movement of the sector $c'$. This enables the indicator to be set according to the speed by which the primary movement part of the device is driven, as will be more fully described hereinafter.

The case $a$ carries rigidly a tubular arm $f$, and on this arm is mounted the auxiliary elongated hub $f'$ of a wheel formed of two parts $f^2$ and $f^3$, which are suitably fastened together. Carried between these parts $f^2$ and $f^3$ to turn therewith is a tire $f^4$, of rubber or the like. The hollow arm $f$ carries loosely a pin $g$, and this pin bears against the walls of a notch $c^3$ in the sector $c'$, so that axial movement of the pin will throw the sector against the action of the spring $d$. The wheel formed of the parts $f^2$ and $f^3$ is hollow, and located movably within this wheel is a spider formed of a plurality (here shown to be four) of ribs $g'$, which spider is fastened to the pin $g$ and moves therewith. The ribs $g'$ have inclined edges against which bear grooved weights $g^2$. These weights are of essentially spherical form and are confined to move radially within the wheel $f^2 f^3$ by partitions $f^5$, these partitions forming radial passages (best shown in Fig. 4) and each passage receiving one rib $g'$. Owing to the arrangement described, the ribs $g'$ are movable laterally within the wheel $f^2 f^3$, carrying the pin $g$ with them, or vice versa.

Now when the wheel is turning the grooved spherical weights $g^2$ are forced outward, and these weights acting between the inclined edges of the ribs $g'$ and the wall $f^3$ of the wheel force the ribs to the right. (See Fig. 3.) This causes a like movement to be given to the rod $g$, and the sector $c'$ is therefore thrown. Movement of the sector $c'$ around its axis will turn the arbor $b'$, and thus throw the needle $b$ over the dial $a^2$, the movement of the needle being commensurate to the extent to which the ribs $g'$ are moved. Now it is obvious that according to the speed at which the wheel $f^2 f^3$ turns the spherical weights $g^2$ will be moved outward, and when the wheel is turning slowly the needle $b$ will be moved slightly, but when the wheel is turning rapidly the movement of the needle will be correspondingly increased. By proper adjustment of the parts the needle may be made to indicate exactly the speed of the vehicle or other machinery with which the indicator is used. The tire $f^4$ of the wheel $f^2 f^3$ is adapted to run in the rotary part of the vehicle or other apparatus, and of course the adjustment must be changed according to the diameter of the wheel or other rotary part. This adjustment may be effected by the cam $e$ and spring $d$, by means of which the resistance to the movement of the sector $c'$ may be increased or diminished, so as to bring about an accurate action of the indicator-needle $b$.

Various changes in the form, proportions, and minor details of my invention may be resorted to without departing from the spirit and scope of my invention. Hence I consider myself entitled to all such variations as may lie within the scope of my claims.

Having thus described my invention, I claim as new and desire to secure by Letters Patent—

1. In a speed-indicator, the combination with a casing, of an indicating device, a hollow arm carried thereby, a wheel turning on the hollow arm, a rod running through the hollow arm, an inclined rib carried on the rod within the wheel, radial partitions within the wheel forming a passage in which the inclined rib is situated, and a centrifugally-operating weight lying in said passage and acting on the inclined rib.

2. A speed-indicator, comprising an indicating device, a rotary member, a reciprocating rod or pin mounted coincident with the axis thereof and adapted to actuate the indicating device, a radial inclined rib attached to the rod and located within the rotary member, a centrifugally-operating weight within the rotary member and running on the inclined rib, for the purpose specified, and means in the rotary member for guiding said centrifugally-operating part radially along the rib.

3. A speed-indicator, comprising a casing, a hollow arm attached thereto, a rotary member having an elongated hub inclosing and turning on the arm, a rod movable axially through the arm, an inclined rib carried by the rod within the rotary member, and a centrifugally-operating weight located within the rotary member and running on the inclined rib, to drive the rod.

4. A speed-indicator, comprising the combination with a supporting member, of a hollow arm carried thereby, a wheel having an elongated hub mounted to turn on the arm the wheel being adapted to engage its periphery on the part whose speed is to be measured, a tire on the wheel, centrifugally-operating devices mounted in the wheel, and means for transmitting the movement of the said devices, such means including a rod mounted to move axially in the hollow arm.

5. A speed-indicator, comprising a rotary member, a radial guide thereon, a grooved weight mounted in the guide to be centrifugally operating, an inclined rib bearing in the groove of the weight, the rib being moved by the weight, and means for transmitting the movement of the rib.

6. A speed-indicator, comprising a rotary member, a radial guide thereon, a grooved weight mounted in the guide to be centrifugally operating, an inclined rib bearing in the groove of the weight, the rib being moved by the weight, and means for transmitting the movement of the rib, said means for transmitting the movement of the rib comprising a longitudinally-movable rod projecting from the wheel or rotary member coincident with the axis thereof.

7. A speed-indicator, comprising a rotary member, a grooved weight mounted therein to be operated by centrifugal force, an inclined rib located in the rotary member and bearing in the groove of the weight, said rib being actuated by the weight, and means for transmitting the movement of the weight.

8. A speed-indicator, comprising a rotary member, a grooved weight mounted therein to be operated by centrifugal force, an inclined rib located in the rotary member and bearing in the groove of the weight, said rib being actuated by the weight, and means for transmitting the movement of the rib, said means comprising a rod movable longitudinally and passing from the rotary member in position coincident with the axis thereof.

9. A speed-indicator, comprising a support, an indicator proper carried by the support, a hollow arm carried rigidly by the support, a rotary member having an elongated hub mounted loosely on and inclosing the hollow arm, a rod projecting through the hollow arm to drive the indicator proper, and centrifugally-operating devices in the rotary member for driving the rod.

10. An indicator, comprising a case or support, an indicator proper, a hollow arm carried by the case or support, a rod mounted to move longitudinally in the hollow arm and serving to actuate the indicator proper, a rotary member having an elongated hub mounted loosely on and inclosing the hollow arm, and centrifugally-operating devices in the rotary member, for imparting longitudinal movement to the rod.

11. In a speed-indicator, the combination of a casing or support, an indicator held thereby, a hollow arm carried by the casing or support, a wheel having an elongated hub mounted loosely on the arm of the casing, means forming a radial guideway in the wheel, a centrifugally-actuated member carried loosely in the guideway, an inclined rib engaged by said centrifugally-actuated member, and a rod attached to the rib and passed axially from the wheel through the hollow arm and having connection with the indicating devices to impart movement thereto.

In testimony whereof I have signed my name to this specification in the presence of two subscribing witnesses.

CLARENCE EDWAN KELLY.

Witnesses:
JESSE A. GIBSON,
MARC RYAN.